US012198826B2

(12) United States Patent
Heibel et al.

(10) Patent No.: US 12,198,826 B2

(45) Date of Patent: Jan. 14, 2025

(54) NUCLEAR BATTERY

(71) Applicant: Westinghouse Electric Company LLC, Cranberry Township, PA (US)

(72) Inventors: Michael D. Heibel, Broomfield, CO (US); Cenk Guler, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/089,249

(22) Filed: Nov. 4, 2020

(65) Prior Publication Data

US 2022/0139588 A1 May 5, 2022

(51) Int. Cl.
*G21H 1/10* (2006.01)

(52) U.S. Cl.
CPC .................................. *G21H 1/103* (2013.01)

(58) Field of Classification Search
None
See application file for complete search history.

(56) References Cited

U.S. PATENT DOCUMENTS 2,930,909 A 3/1960 Lieb et al.
3,767,947 A 10/1973 Adler et al.
3,909,617 A 9/1975 Jones et al.
3,934,162 A 1/1976 Adler et al.
4,097,654 A * 6/1978 Guazzoni .............. G21H 1/103 429/5
5,280,213 A * 1/1994 Day ......................... G21D 7/00 310/305
5,440,187 A * 8/1995 Little ..................... G21H 1/103 136/202
5,721,462 A 2/1998 Shanks
6,043,423 A * 3/2000 Satomura ................ H01L 35/08 136/203

(Continued)

FOREIGN PATENT DOCUMENTS

CN 102543238 A 7/2012
CN 110444313 A 11/2019

(Continued)

OTHER PUBLICATIONS

International Search Report and Written Opinion for International PCT Application No. PCT/US2021/072228, dated Feb. 23, 2022.

(Continued)

*Primary Examiner* — Tamir Ayad
(74) *Attorney, Agent, or Firm* — K&L Gates LLP

(57) ABSTRACT

A nuclear battery is provided. The nuclear battery comprises a radiation source layer, a first electrical insulator layer, a casing layer, a first electrode, and a second electrode. The radiation source layer comprises a composition configurable to emit beta radiation. The first electrical insulator layer is disposed over the radiation source layer. The casing layer is disposed over the first electrical insulator layer. The casing layer comprises a composition configured to inhibit traversal of beta radiation. The first electrode is in electrical communication with the radiation source layer. The second electrode is in electrical communication with the casing layer. A voltage potential is present between the first electrode and the second electrode when the radiation source layer emits beta radiation.

20 Claims, 1 Drawing Sheet

(56) References Cited

U.S. PATENT DOCUMENTS

| | | | | |
|---|---|---|---|---|
| 6,500,575 | B1 | 12/2002 | Shiue et al. | |
| 8,487,392 | B2 | 7/2013 | Spencer | |
| 9,006,955 | B2 * | 4/2015 | Batchelder | H01L 31/068 310/303 |
| 11,289,757 | B2 * | 3/2022 | Nemanick | H01L 35/32 |
| 2006/0244410 | A1 * | 11/2006 | Hacsi | H01G 11/14 320/101 |
| 2011/0031572 | A1 | 2/2011 | Spencer et al. | |
| 2015/0083180 | A1 * | 3/2015 | Lang | H01L 35/30 136/207 |
| 2015/0357068 | A1 | 12/2015 | Smith | |
| 2017/0309359 | A1 * | 10/2017 | Whitehead | G21H 1/04 |
| 2019/0392961 | A1 * | 12/2019 | Choi | G21G 1/12 |
| 2021/0391092 | A1 * | 12/2021 | Matthews | G21G 4/06 |

FOREIGN PATENT DOCUMENTS

| | | | |
|---|---|---|---|
| TW | 434927 | B | 5/2001 |
| WO | 2005001475 | A2 | 1/2005 |

OTHER PUBLICATIONS

International Search Report and Written Opinion for International PCT Application No. PCT/US2021/072958, dated Jun. 3, 2022.

Search Report for corresponding Taiwan Application No. 110147525, dated Jun. 13, 2022.

Search Report for corresponding Taiwan Application No. 110141200, dated Oct. 4, 2022.

* cited by examiner

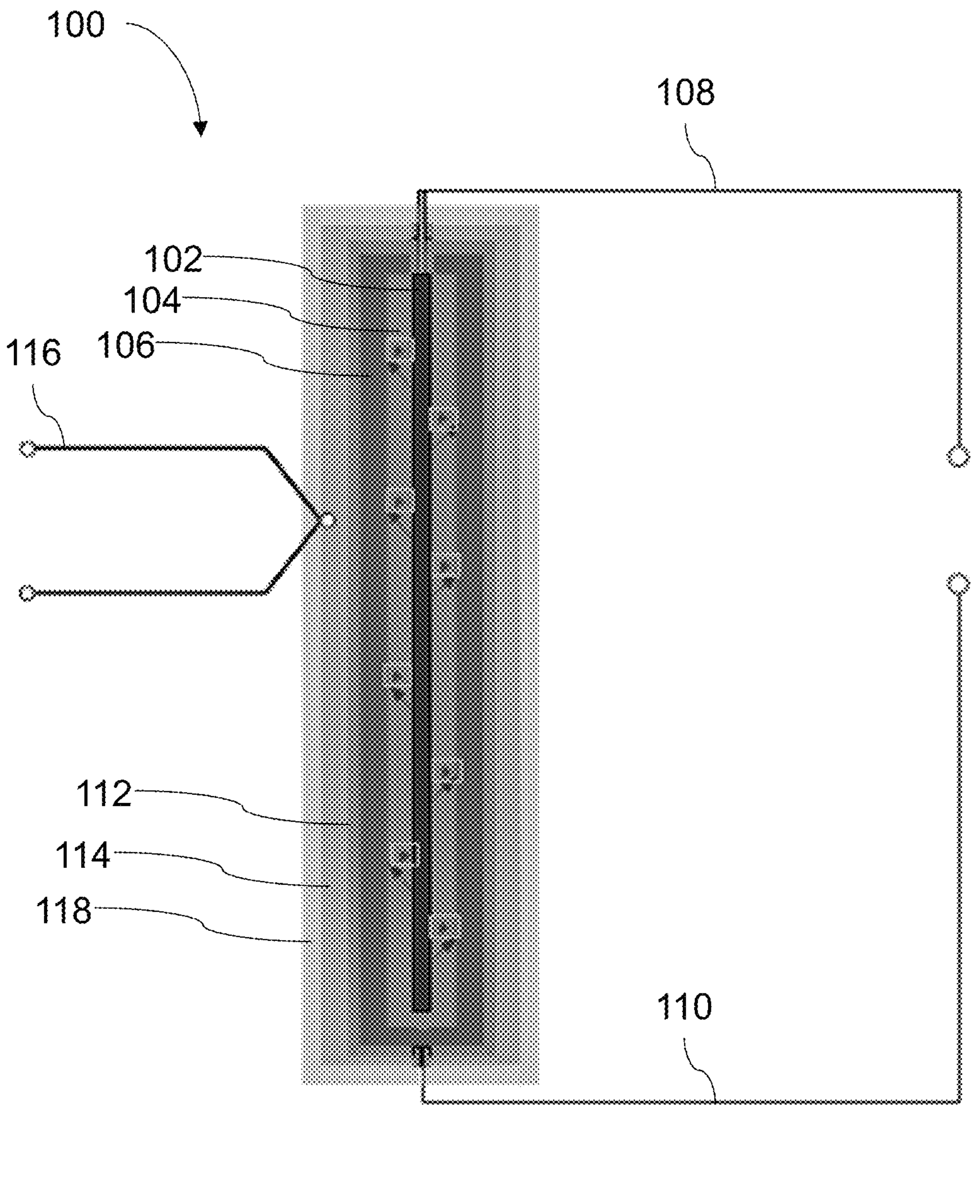
100
108
102
104
106
116
112
114
118
110

NUCLEAR BATTERY

BACKGROUND

Radioisotope Thermal Generators (RTGs) produce heat and utilize thermocouples to convert the heat into electricity. Plutonium-238 has typically been used in RTGs as it has a desirable half-life of 87.7 years and Plutonium-238 emits alpha radiation that decelerates rapidly in the material surrounding the Plutonium-238 to produce heat. Additionally, Plutonium-238 produces essentially no gamma radiation and the deceleration of alpha radiation produces essentially no gamma radiation, which minimizes the radiation shielding needed to allow the Plutonium-238 powered RTGs to be used in close proximity to people and/or radiation-sensitive electronics. However, using Plutonium-238 in RTGs presents challenges.

SUMMARY

The present disclosure provides a nuclear battery. The nuclear battery comprises a radiation source layer, a first electrical insulator layer, a casing layer, a first electrode, and a second electrode. The radiation source layer comprises a composition configurable to emit beta radiation. The first electrical insulator layer is disposed over the radiation source layer. The casing layer is disposed over the first electrical insulator layer. The casing layer comprises a composition configured to inhibit traversal of beta radiation. The first electrode is in electrical communication with the radiation source layer. The second electrode is in electrical communication with the casing layer. A voltage potential is present between the first electrode and the second electrode when the radiation source layer emits beta radiation.

It is understood that the inventions described in this specification are not limited to the examples summarized in this Summary. Various other aspects are described and exemplified herein.

BRIEF DESCRIPTION OF THE DRAWING

The features and advantages of the examples, and the manner of attaining them, will become more apparent, and the examples will be better understood by reference to the following description of examples taken in conjunction with the accompanying drawing, wherein:

The figure is a partial cross section of a nuclear battery according to the present disclosure.

The exemplifications set out herein illustrate certain examples, in one form, and such exemplifications are not to be construed as limiting the scope of the examples in any manner.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

Typically RTGs only generate electrical energy from thermal energy produced by the deceleration of alpha radiation from plutonium-238. However, plutonium-238 can be an undesirable fuel. Additionally, beta emitting compositions were not previously used as beta radiation can produce Bremsstrahlung radiation emissions (e.g., gamma radiation) which can be undesirable and require an undesirable large radiation shielding layer. Further, it has been difficult to increase the power density of RTGs. Accordingly, the present inventors have provided a nuclear battery that can generate electrical energy directly from beta radiation emissions without the need to first create thermal energy from the beta radiation, increase power density of RTGs, and/or reduce electrical shielding requirements. In various examples the nuclear battery can generate electrical energy both directly from the beta radiation and from thermal energy.

Referring to the Figure, a nuclear battery 100 is provided. The nuclear battery 100 comprises a radiation source layer 102, a first electrical insulator layer 104, a casing layer 106, a first electrode 108, and a second electrode 110. In some examples, the nuclear battery 100 optionally comprises a second electrical insulator layer 112, a radiation shielding layer 114, a thermal energy harvesting device 116, and a thermal insulation layer 118.

The nuclear battery 100 can be configured as a battery plate, a rod, or other shape. In various examples, the nuclear battery 102 can comprise a single battery plate as shown in the Figure or multiple battery plates (not shown). In the rod shaped configuration of the nuclear battery 100, each of the layers 102, 104, 106, 112, 114, and 118 can have the vertical cross section as shown in the Figure. The length of the rod can be controlled to produce a desired amount of electric power. The rod shape can be a spiral rod shape to minimize space required to achieve a desired power output.

The radiation source layer 102 comprises a composition configurable to emit beta radiation. For example, the radiation source layer 102 can comprises thulium, a thulium isotope, strontium, a strontium isotope, or a combination thereof. In certain examples, the radiation source layer 102 comprises a radioisotope that emits beta radiation. The radiation source layer 102 can be plate shaped or rod shaped. The radiation source layer 102 can be produced with a thickness based on the desired amount of beta radiation to be emitted. For example, the radiation source layer 102 can be 1 mm in thickness. The dimensions of the radiation source layer 102 can be sized to produce a required amount of electric power.

The first electrical insulator layer 104 is disposed over the radiation source layer 102. For example, the first electrical insulator layer 104 can be in direct contact with and surround the radiation source layer 102. The first electrical insulator layer 104 can comprise a composition and thickness suitable to provide a desired electrical resistance between the radiation source layer 102 and the casing layer 106. For example, the first electrical insulator layer can comprise a metal oxide. In various examples, the first electrical insulator layer can comprise magnesium oxide, aluminum oxide, diamond, or a combination thereof.

The casing layer 106 is disposed over the first electrical insulator layer 104. For example, the casing layer 106 can be in direct contact with and surround the first electrical insulator layer 104. The casing layer 106 comprises a composition and thickness configured to inhibit traversal of beta radiation (e.g., slow the beta radiation) through the casing layer 106. For example, the casing layer 106 can comprise a metal or a metal alloy, such as, for example, a metal with an atomic number of 13 or less, or a metal alloy with the primary metal having an atomic number of 13 or less. In various examples, the casing layer can comprise aluminum, an aluminum alloy, magnesium, or a magnesium alloy. In examples where the casing layer 106 comprises a composition with a metal comprising an atomic number of 13 or less, there can be a minimal, if any, Bremsstrahlung radiation produced due to the inhibition of traversal of the beta radiation through the casing layer 106. Therefore, the size of the radiation shielding layer 114 can be reduced.

The first electrode 108 is in electrical communication with the radiation source layer 102. The first electrode 108 can be electrically insulated from the casing layer 106, the radiation shielding layer 114, and any other electrically conductive layers in the nuclear battery 110 besides the radiation source layer 102. In various examples, the first electrode 108 has a positive polarity.

The second electrode 110 is in electrical communication with the casing layer 106. The second electrode 110 is electrically insulated from the radiation shielding layer 114 and the radiation source layer 102. In various examples, the second electrode 110 has a negative polarity.

The beta radiation emitted by the radiation source layer 102 can be directly used to produce electrical energy without the need to first produce thermal energy. For example, the beta radiation emitted by the radiation source material 102 can traverse through the first electrical insulator layer 104 to the casing layer 106. The traversal of the beta radiation can create a voltage potential between the radiation source layer 102 and the casing layer 106. For example, the beta radiation can comprise electrons which can be transferred to the casing layer 106.

The first electrical insulator layer 104 can be configured with a thickness to create a desirable electrical resistance between the radiation source material 102 and the casing layer 106 while enabling traversal of the beta radiation through the first electrical insulator layer 104 such that the voltage potential can be created. Thus, due to the electrical communication between the first electrode 108 and the radiation source layer 102 and the electrical communication between the second electrode 110 and the casing layer 106, a voltage potential is present between the first electrode 108 and the second electrode 110 when the radiation source layer 102 emits beta radiation. Alpha radiation emitters that are used in typical RTGs would not be able to achieve a desirable voltage potential since alpha radiation only travels very short distances in solid materials.

The second electrical insulator layer 112 is disposed over the casing layer 106. For example, the second electrical insulator layer 112 can be in direct contact with and surround the casing layer 106. The second electrical insulator layer 112 can comprise a composition and thickness suitable to provide a desired electrical resistance between the casing layer 106 and the radiation shielding layer 114 such that the radiation shielding layer 114 is inhibited from interfering with the electric potential generated between the casing layer 106 and the radiation source layer 102. For example, the second electrical insulator layer 112 can comprise a metal oxide. In various examples, the second electrical insulator layer 112 can comprise magnesium oxide, aluminum oxide, diamond, or a combination thereof. The second electrical insulator layer 112 can be thermally conductive. Thus, heat generated in the casing layer 106 by inhibition traversal of beta radiation be conducted to the radiation shielding layer 114.

The radiation shielding layer 114 is disposed over the second electrical insulator layer 112. For example, the radiation shielding layer 114 can be in direct contact with and surround the second electrical insulator layer 112. The radiation shielding layer 114 can comprise a composition and thickness suitable to inhibit gamma radiation from traversing through the radiation shielding layer 114. For example, the radiation shielding layer 114 can comprise a metal or metal alloy. In various examples, the radiation shielding layer 114 can comprise tungsten, a tungsten alloy, iron, an iron alloy, uranium, a uranium alloy, or a uranium compound. The radiation shielding layer 114 can be in thermal communication with the casing layer 106. The radiation shielding layer 114 can produce thermal energy by inhibiting additional beta radiation and/or Bremsstrahlung radiation from the casing layer 106 from traversing through the radiation shielding layer 114.

The thermal energy harvesting device 116 is in physical contact with the radiation shielding layer 114 and configured to receive thermal energy from the radiation shielding layer 114 and convert the thermal energy into electrical energy. For example, the thermal energy harvesting device 116 can comprise a thermocouple. In various examples, the thermal energy from the radiation shielding layer 114 can be harvested in a manner used by typical RTGs.

Since the radiation shielding layer 116 can be heated by the thermal energy, the thermal insulation layer 118 can be disposed over the radiation shielding layer 114 such that convection losses of thermal energy from the nuclear battery 100 are reduced thereby increasing the efficiency of the nuclear battery 100. For example, the thermal insulation layer 118 can be in direct contact with and surround the radiation shielding layer 116. The thermal insulation layer 118 can comprise fiberglass, silica, carbon, other thermally insulating materials, and combinations thereof.

As described herein, the nuclear battery 100 can generate electrical energy from converting thermal energy into electrical energy utilizing the thermal energy harvesting device 116 and by directly from the emission of beta radiation from the radiation source layer 102. The nuclear battery 100 can be configured to output at least 0.1 watt per cubic centimeter of volume of the nuclear battery (watt/$cm^3$) from the first and second electrodes, 108 and 110, such as, for example, at least 0.5 watt/$cm^3$, at least 1 watt/$cm^3$, at least 2 watt/$cm^3$, at least 10 watts/$cm^3$, or at least 50 watt/$cm^3$.

The nuclear battery 100 can be used in variety of applications where a substantially constant power source is desired. The nuclear battery 100 can be used to power computers or communication devices of military equipment, or it can be used to power unmanned vehicles such as planes or submarines, or it can be used in civil applications such as electric cars to provide longer driving range by powering auxiliary functions such as interior heating or cooling.

Powering unmanned vehicles can also allow these vehicles to operate on conditions that are not normally achievable. Since the nuclear battery 100 does not need air (e.g., oxygen) in opposed to currently used combustion engines to power, vehicles can travel at higher altitudes and/or at colder temperatures.

Various aspects of the invention according to the present disclosure include, but are not limited to, the aspects listed in the following numbered clauses.

1. A nuclear battery comprising:

a radiation source layer, wherein the radiation source layer comprises a composition configurable to emit beta radiation;

a first electrical insulator layer disposed over the radiation source layer;

a casing layer disposed over the first electrical insulator layer, wherein the casing layer comprises a composition configured to inhibit traversal of beta radiation;

a first electrode in electrical communication with the radiation source layer; and a second electrode in electrical communication with the casing layer, wherein a voltage potential is present between the first electrode and the second electrode when the radiation source layer emits beta radiation.

2. The nuclear battery of clause 1, wherein the radiation source layer comprises thulium, a thulium isotope, strontium, a strontium isotope, or a combination thereof.

3. The nuclear battery of any one of clauses 1-2, wherein the first electrical insulator layer comprises a metal oxide.

4. The nuclear battery of any one of clauses 1-3, wherein the first electrical insulator layer comprises magnesium oxide, aluminum oxide, diamond, or a combination thereof.

5. The nuclear battery of any one of clauses 1-4, wherein the casing layer comprises a metal or a metal alloy.

6. The nuclear battery of any one of clauses 1-5, wherein the casing layer comprises aluminum, an aluminum alloy, magnesium, or a magnesium alloy.

7. The nuclear battery of any one of clauses 1-6, further comprising:

a second electrical insulator layer disposed over the casing layer;

a radiation shielding layer disposed over the second electrical insulator layer; and a thermal energy harvesting device in physical contact with the radiation shielding layer, the thermal energy harvesting device is configured to convert thermal energy into electrical energy.

8. The nuclear battery of clause 7, further comprising a thermal insulation layer disposed over the radiation shielding layer.

9. The nuclear battery of any one of clauses 7-8, wherein the thermal energy harvesting device comprises a thermocouple.

10. The nuclear battery of any one of clauses 7-9, wherein the radiation shielding layer comprises a metal or metal alloy.

11. The nuclear battery of any one of clauses 7-10, wherein the radiation shielding layer comprises tungsten, a tungsten alloy, iron, an iron alloy, uranium, or a uranium alloy.

12. The nuclear battery of any one of clauses 7-11, wherein the first electrode is electrically insulated from the casing layer and the radiation shielding layer.

13. The nuclear battery of any one of clauses 7-12, wherein the second electrode is electrically insulated from the radiation shielding layer.

14. The nuclear battery of any one of clauses 1-13, wherein the nuclear battery is configured to output at least 0.1 watt per cubic centimeter of volume of the nuclear battery.

15. The nuclear battery of any one of clauses 1-14, wherein the radiation source layer is plate shaped or rod shaped.

Various features and characteristics are described in this specification to provide an understanding of the composition, structure, production, function, and/or operation of the invention, which includes the disclosed methods and systems. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a method or system that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a layer "applied over" a substrate does not preclude the presence of another layer or other layers of the same or different composition located between the applied layer and the substrate. Likewise, a second layer "applied over" a first layer does not preclude the presence of another layer or other layers of the same or different composition located between the applied second layer and the applied first layer.

Whereas particular examples of this invention have been described above for purposes of illustration, it will be evident to those skilled in the art that numerous variations of the details of the present invention may be made without departing from the invention as defined in the appended claims.

What is claimed is:

1. A nuclear battery comprising:

a radiation source layer, wherein the radiation source layer comprises a composition configurable to emit beta radiation;

a first electrical insulator layer disposed over the radiation source layer;

a casing layer disposed over the first electrical insulator layer, wherein the casing layer comprises a metal with an atomic number of 13 or less or a metal alloy with a primary metal having an atomic number of 13 or less to prevent production of Bremsstrahlung radiation;

a first electrode in electrical communication with the radiation source layer, wherein the first electrical insulator layer entirely surrounds the radiation source layer except where the first electrode extends through the first electrical insulator, and wherein the casing layer entirely surrounds the first electrical insulator layer except where the first electrical insulator layer surrounds the first electrode and the first electrical insulator layer extends through the casing layer; and a second electrode in electrical communication with the casing layer, wherein the electrical communication between the first electrode and the radiation source and the electrical communication between the second electrode and the casing layer is configured to create a voltage potential between the first electrode and the second electrode directly from an emission of beta radiation from the radiation source layer, wherein the emission of beta radiation from the radiation source layer includes a traversal of electrons through the first electrical insulator layer to the casing layer.

2. The nuclear battery of claim 1, wherein the radiation source layer comprises thulium, a thulium isotope, strontium, a strontium isotope, or a combination thereof.

3. The nuclear battery of claim 1, wherein the first electrical insulator layer comprises a metal oxide.

4. The nuclear battery of claim 1, wherein the first electrical insulator layer comprises magnesium oxide, aluminum oxide, diamond, or a combination thereof.

5. The nuclear battery of claim 1, wherein the casing layer comprises aluminum, an aluminum alloy, magnesium, or a magnesium alloy.

6. The nuclear battery of claim 1, further comprising:

a second electrical insulator layer disposed over the casing layer;

a radiation shielding layer disposed over the second electrical insulator layer; and a thermal energy harvesting device in physical contact with the radiation shielding layer, the thermal energy harvesting device is configured to convert thermal energy into electrical energy.

7. The nuclear battery of claim 6, further comprising a thermal insulation layer disposed over the radiation shielding layer.

8. The nuclear battery of claim 6, wherein the thermal energy harvesting device comprises a thermocouple.

9. The nuclear battery of claim 6, wherein the radiation shielding layer comprises a metal or metal alloy.

10. The nuclear battery of claim 6, wherein the radiation shielding layer comprises tungsten, a tungsten alloy, iron, an iron alloy, uranium, or a uranium alloy.

11. The nuclear battery of claim 6, wherein the first electrode is electrically insulated from the casing layer and the radiation shielding layer.

12. The nuclear battery of claim 6, wherein the second electrode is electrically insulated from the radiation shielding layer.

13. The nuclear battery of claim 1, wherein the nuclear battery is configured to output at least 0.1 watt per cubic centimeter of volume of the nuclear battery directly from the emission of beta radiation from the radiation source layer.

14. The nuclear battery of claim 1, wherein the radiation source layer is plate shaped or rod shaped.

15. The nuclear battery of claim 1, wherein the first electrode is electrically insulated from the casing layer.

16. The nuclear battery of claim 15, wherein the second electrode is electrically insulated from the radiation source layer.

17. The nuclear battery of claim 1, wherein the first electrode is in contact with the radiation source layer and the second electrode is in contact with the casing layer.

18. The nuclear battery of claim 1, wherein the nuclear battery is configured to generate electrical energy at least directly from beta radiation emissions without first creating thermal energy from the beta radiation.

19. The nuclear battery of claim 1, wherein the first electrode has a positive polarity and wherein the second electrode has a negative polarity.

20. The nuclear battery of claim 1, wherein the second electrode does not directly contact the first electrical insulator layer.

* * * * *